(12) United States Patent
Deutsch et al.

(10) Patent No.: US 7,276,854 B1
(45) Date of Patent: Oct. 2, 2007

(54) DECORATIVE LAMP AND LIGHTING SYSTEM FOR VEHICLES

(75) Inventors: Daniel Deutsch, Orlando, FL (US);
Jason Barber, Orlando, FL (US);
Russell Rothan, Orlando, FL (US)

(73) Assignee: Theory3, Inc., Richmond, VA (US)

( * ) Notice: Subject to any disclaimer, the term of this patent is extended or adjusted under 35 U.S.C. 154(b) by 0 days.

(21) Appl. No.: 11/249,754

(22) Filed: Oct. 13, 2005

Related U.S. Application Data

(63) Continuation-in-part of application No. 11/060,063, filed on Feb. 17, 2005.

(60) Provisional application No. 60/618,398, filed on Oct. 13, 2004.

(51) Int. Cl.
*B60Q 1/14* (2006.01)
*A47G 35/00* (2006.01)

(52) U.S. Cl. .......................... 315/77; 362/565

(58) Field of Classification Search ................. 315/77, 315/78, 82; 362/555, 558, 582, 546, 36, 362/84, 800, 806, 27, 613, 629, 616, 565
See application file for complete search history.

(56) References Cited

U.S. PATENT DOCUMENTS 5,442,527 A * 8/1995 Wichelt ...................... 362/459
6,372,895 B1 * 4/2002 Bentsen et al. ............... 536/4.1
6,533,508 B1 * 3/2003 Nonaka ....................... 409/132
2002/0041499 A1 * 4/2002 Pederson .................... 362/545
2003/0206411 A9 * 11/2003 Dowling et al. ............ 362/234
2004/0105264 A1 * 6/2004 Spero ......................... 362/276
2005/0128751 A1 * 6/2005 Roberge et al. ............. 362/276

* cited by examiner

*Primary Examiner*—Shih-Chao Chen
*Assistant Examiner*—Minh Dieu A
(74) *Attorney, Agent, or Firm*—Allen, Dyer, Doppelt, Milbrath & Gilchrist, P.A.

(57) ABSTRACT

A decorative lighting system for a vehicle comprises a microprocessor controller; an integrated circuit having the microcontroller connected therein and connectable to a power source; a plurality of light-emitting diodes connected in the circuit; a housing hermetically enclosing the microcontroller, integrated circuit, and plurality of light-emitting diodes, the housing including one or more layers of resin material containing a fluorescent compound responsive to light selected from ultraviolet, near ultraviolet and combinations thereof; and an adhesive connector positioned on an exterior surface of the decorative light. The plurality of light-emitting diodes is capable of generating light containing one or more visible wavelengths, ultraviolet light, near ultraviolet light and combinations thereof responsive to a control signal from the microcontroller.

2 Claims, 2 Drawing Sheets

DECORATIVE LAMP AND LIGHTING SYSTEM FOR VEHICLES

RELATED APPLICATION

This application is a continuation-in-port of application Ser. No. 11/060,063, which was filed on Feb. 17, 2005, and also claims priority from co-pending provisional application Ser. No. 60/618,398, which was filed on Oct. 13, 2004, both of which applications are incorporated herein by reference in their entireties.

FIELD OF THE INVENTION

This invention relates to lighting devices and, more specifically, to a decorative lamp or light disk suitable for use as a lighting accessory for vehicles, particularly by motor vehicles, and by vehicle drivers.

BACKGROUND OF THE INVENTION

Vehicles have been for many years adorned by their drivers with a variety of lighting accessories. These lighting devices may draw electrical power from the vehicle's own battery and/or electrical charging system, or may have one or more internal batteries in the lighting device. Accessory lights for vehicles are often used to personalize the vehicle so as to make it more distinctive.

SUMMARY OF THE INVENTION

With the foregoing in mind, the present invention advantageously provides a decorative lamp for a vehicle. The lamp comprises a microprocessor controller and an integrated circuit having said controller connected therein and connectable to a power source. A plurality of light-emitting diodes is connected in said circuit and a housing hermetically enclosing the microprocessor controller, an integrated circuit, and a plurality of light-emitting diodes.

The housing will preferably include consisting of one or more layers of resin material containing a fluorescent compound. By "fluorescent," the skilled will recognize that the material itself emits light in response to the absorption of light from a electromagnetic source of light in the ultraviolet, or near the ultraviolet range of the electromagnetic spectrum. To provide an electromagnetic source near the material, the plurality of light-emitting diodes is capable of generating light, in the ultraviolet, near ultraviolet range; however, the skilled will recognize that light in the visible range may also be used but, with the possible exception of blue in the near-ultraviolet region, visible light typical will not cause the material to fluoresce. A microprocessor controller may be used to vary the light thus emitted by frequency, intensity or color. A connector, preferably an adhesive connector, is positioned on an exterior surface of the decorative light.

Preferably, the present invention includes a light system for a motor vehicle. The light system includes the following components, in combination. A hand-held remote control unit has an input keyboard and a rotatable control whereby commands are generated and transmitted from the remote control unit in a wireless signal. A sensor is capable of recognizing the wireless signal and generating a sensor signal responsive thereto. A central processing unit has a microcontroller and is connected to the sensor to thereby generate a control signal responsive to the sensor signal. The central processing unit has an input connectable to a sound system in the motor vehicle to thereby receive a signal containing sound information. The central processing unit is capable of coordinating the control signal with the sound information. A light stick having an approximately cylindrical and at least partially translucent weather resistant housing contains a plurality of light-emitting diodes operatively connected to the central processing unit. The plurality of light-emitting diodes is capable of generating visible light having variable intensity and duration, and containing one or more colors responsive to the control signal from the central processing unit.

Another embodiment of the system additionally includes the light which has a microprocessor controller, an integrated circuit having the controller connected therein and connectable to a power source, a plurality of light-emitting diodes connected in the circuit, and a housing hermetically enclosing the microprocessor controller, integrated circuit, and plurality of light-emitting diodes. The housing consists of one or more layers of resin material containing a fluorescent compound responsive to light selected from ultraviolet, near ultraviolet and combinations thereof. An adhesive connector is positioned on an exterior surface of the decorative light. In this embodiment, the plurality of light-emitting diodes is capable of generating light containing one or more visible wavelengths, ultraviolet, near ultraviolet and combinations thereof responsive to a control signal from the microprocessor controller.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

Figure 1:
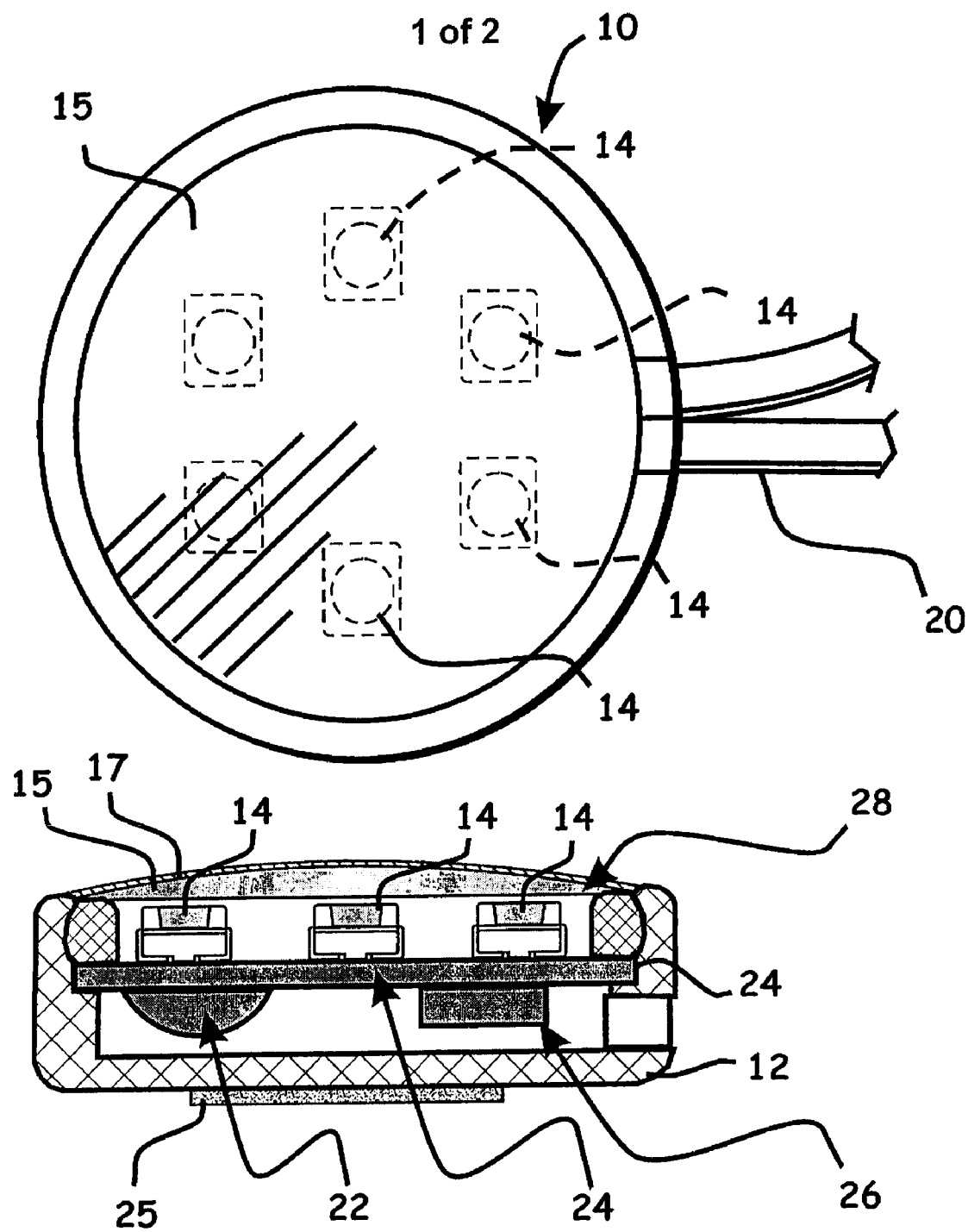
FIG. 1 shows a top plan view and corresponding cross sectional side elevation view of the light disk according to an embodiment of the present invention.
Figure 2:
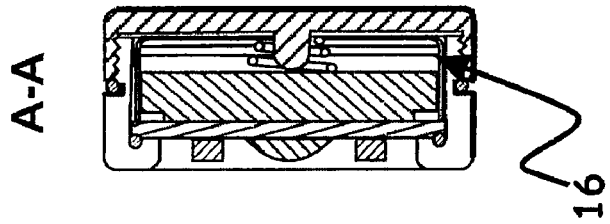
FIG. 2 depicts a bottom plan view (A), side elevation view (B), top plan view (C), and a cross section view along lines A-A of the top plan view of the present light disk.
Figure 2:
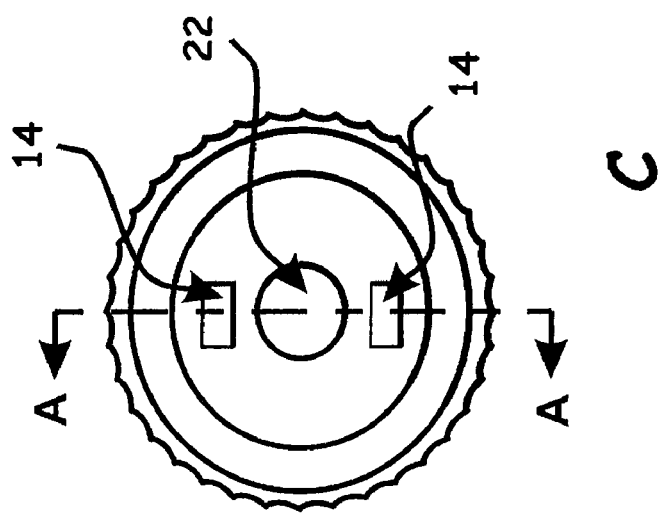
Figure 2:
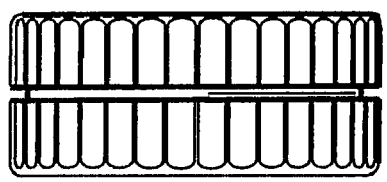
Figure 2:
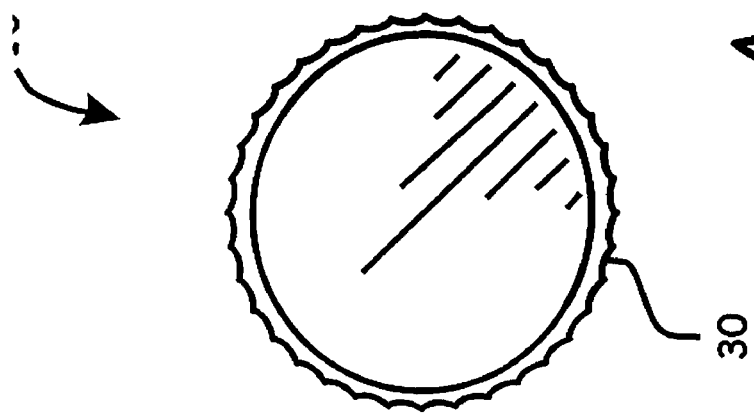

FIGS. 1 and 2 illustrate the present decorative lamp or light disk 10, which is a small-profile lighting fixture having a moisture and shock resistant housing 12 that may contain single or multiple LED lighting sources 14, in a single or in multiple colors that may run as a continuous lighting source, with a fixed predetermined program on-board, or controlled remotely by connection to a suitable controller system. A cover 15 over the LEDs is part of housing 12 and, for example, may be of thickness 17. The light disk 10 is intended for low-voltage applications (typically 5 volts direct current up to 18 volts direct current), making it useful in typical automotive, mobile or portable applications. The light disk 10 is connected to its power source 16 and/or controller 18 via a flexible wire harness 20 (approx. 30 inches for ease of installation) and contains fused power protection in case of short-circuit to protect both the unit and the consumer. Preferably, the light disk 10 would come packaged with double-sided foam mounting tape 25 that allows the consumer to quickly attach the light disk to any clean, flat surface.

The present light disk 10 is most likely to find use in lighting the interior of automobiles as specialty accent lighting, such as headliners, footwells, headrests, seating, window facades, etc, but is not limited to interior use in a vehicle, provided that installation is in a safe and legally compliant manner.

An embodiment of the invention, as shown in FIG. 1 includes an integrated circuit (IC) 22, a printed circuit board (PCB) 24 and a positive voltage regulator 26 rated at 5V (7805), and a plurality of LEDs, which may be of any type known in the art. Additionally, the LEDs are covered by at least one layer of epoxy 28, as shown. The epoxy 28 may incorporate a fluorescent material responsive to UV or near-UV light generated by one or more of the LEDs.

Another embodiment of the light disk 10, depicted in FIG. 2, preferably contains its own power source 16 consisting of thin and user-replaceable lithium coin cells. The unit may be activated by a twist-on/twist off feature (not shown) that also provides for the user to gain access to the battery compartment. Other switch mechanisms are also adaptable to the invention. The ribbed edges 30 allow for a mechanical grip to be established, not only by the user when activating the unit but also by attachable style-covers that may appear as licensed characters, fun-shapes, simple geometries or other, in colored or UV-responsive fluorescent plastics to give added effect. The light disk 10 may be used with or without these style-covers. As noted above, this type of unit would also be packaged for retail sale with double-sided foam mounting tape that allows the consumer to quickly attach the light disk 10 to any clean, flat surface. Without the style-cover, the unit may be used as an accent piece, or attached to personal gear as a means of increasing the visibility of a vehicle or its driver, such as, but not limited to, by mounting to the rear of a bicycle helmet. With the style-covers attached, the light output is still sufficient so that the visibility of the vehicle and/or the driver is enhanced.

In addition, in yet another embodiment, the light disk 10 featuring a housing 12 having a plurality of LEDs 14 could replace the LEDs within the light stick of the preferred embodiment or could be connected in the system as an extra light fixture. The light disk 10 fixture features an internal integrated circuit 22 and micro controller 18 that controls the color and emission frequency of the LEDs in combination with the microcontroller of a central CPU. An adhesive attachment 25 is best located on an underside of housing 12 as a means for attaching the light disk to a surface. The LEDs 14 of each lighting fixture may either each have a discrete color or each may have multiple colors. Optionally, the plurality of LEDs 14 would not be controlled exclusively by the microcontroller of the central CPU 18 but in combination with the internal microcontroller of each lighting fixture. The internal microcontroller 18 of each lighting fixture could similarly be capable of directly receiving the infrared signal from the user remote control, as with the central CPU microcontroller, or could be indirectly controlled via a wired connection to the system. While in one embodiment, the CPU would not control the color and timing frequency of these LEDs, it could serve to activate each lighting fixture, whereas after activation the lighting fixture microcontroller would control the color and timing frequency.

In the specification there have been disclosed typical preferred embodiments of the invention, and although specific terms are employed, the terms are used in a descriptive sense only and not for purposes of limitation. The invention has been described in some detail, but it will be apparent that various modifications and changes can be made within the spirit and scope of the invention as described in the foregoing specification and as defined in the appended claims.

Accordingly, in the drawings and specification there have been disclosed typical preferred embodiments of the invention and, although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as recited in the appended claims.

That which is claimed:

1. A decorative lighting fixture for a vehicle, comprising:
    a microprocessor controller;
    an integrated circuit having said controller connected therein and connectable to a power source;
    a plurality of light-emitting diodes connected in said circuit;
    a housing hermetically enclosing said microprocessor controller, integrated circuit, and plurality of light-emitting diodes, said housing including one or more layers of resin material containing a fluorescent compound responsive to light selected from ultraviolet, near ultraviolet and combinations thereof; and
    an adhesive connector positioned on an exterior surface of said decorative lighting fixture;
    wherein said plurality of light-emitting diodes is capable of generating light containing one or more visible wavelengths, ultraviolet, near ultraviolet and combinations thereof responsive to a control signal from said microprocessor controller.

2. A decorative lighting system for a motor vehicle, comprising in combination:
    a hand-held remote control unit having an input keyboard and a rotatable control whereby commands are generated and transmitted from said remote control unit in a wireless signal;
    a sensor capable of recognizing the wireless signal and generating a sensor signal responsive thereto;
    a central processing unit having a first microcontroller and connected to said sensor to thereby generate a control signal responsive to said sensor signal, said central processing unit having an input connectable to a sound system positioned in the motor vehicle to thereby receive a signal containing sound information, said central processing unit being capable of coordinating the control signal with the sound information;

a light stick having an approximately cylindrical and at least partially translucent weather resistant housing containing a plurality of light-emitting diodes operatively connected to said central processing unit, said plurality of light-emitting diodes being capable of generating visible light having variable intensity and duration, and containing one or more colors responsive to the control signal from said central processing unit; and a decorative lamp having a second microcontroller, an integrated circuit having said microcontroller connected therein and connectable to a power source, having a plurality of light-emitting diodes connected in said circuit, and having a housing hermetically enclosing said microcontroller, integrated circuit, and plurality of light-emitting diodes, said housing including one or more layers of resin material containing a fluorescent compound responsive to light selected from ultraviolet, near ultraviolet and combinations thereof, and having an adhesive connector positioned on an exterior surface of said decorative lamp, wherein said plurality of light-emitting diodes is capable of generating light containing one or more visible wavelengths, ultraviolet light, near ultraviolet light and combinations thereof responsive to a control signal from said microprocessor controller.

* * * * *